S. GOLDHAMMER.
FOUNTAIN FEED FLY KILLER.
APPLICATION FILED AUG. 20, 1914.
1,139,030.
Patented May 11, 1915.
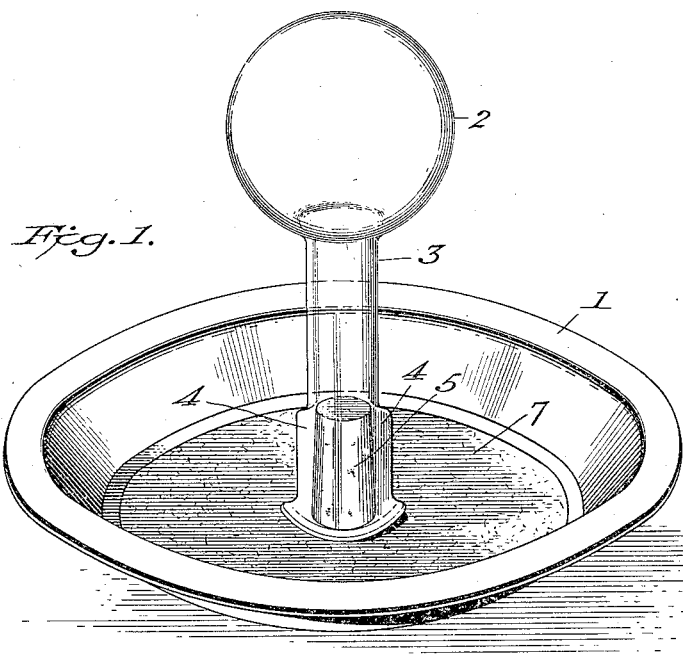
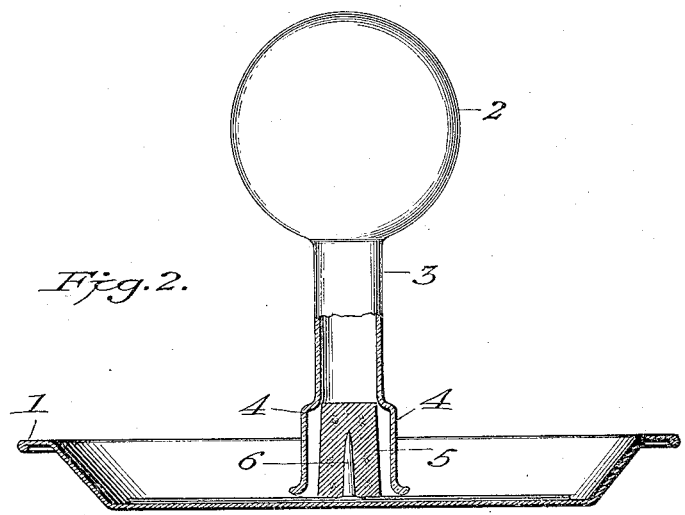
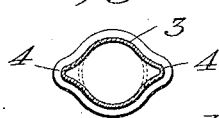
Witnesses:
G. Sargent Elliott
Adella M. Fowle
Inventor:
Samuel Goldhammer
By H. S. Bailey, Attorney.

UNITED STATES PATENT OFFICE.

SAMUEL GOLDHAMMER, OF DENVER, COLORADO.

FOUNTAIN-FEED FLY-KILLER.

1,139,030. Specification of Letters Patent. Patented May 11, 1915.

Application filed August 20, 1914. Serial No. 857,701.

*To all whom it may concern:*

Be it known that I, SAMUEL GOLDHAMMER, a citizen of the United States of America, residing in the city and county of Denver and State of Colorado, have invented a new and useful Fountain-Feed Fly-Killer, of which the following is a specification.

My invention relates to an improved fountain feed fly killer.

The object of the invention is to provide a device of this character comprising a tray and a container or reservoir for automatically feeding a supply of water to said tray, the reservoir being so arranged relatively to the tray that the flow of water therefrom is controlled by a predetermined amount of water in the tray which seals the outlet from the reservoir until by evaporation its depth is decreased sufficiently to unseal the said outlet and permit water to flow into the tray, said tray being provided with a suitable absorbent poisonous paper or other material by which the water in the tray is rendered poisonous.

This object is accomplished by the device illustrated in the accompanying drawings, in which:

Figure 1, is a perspective view of the improved fountain feed fly killer. Fig. 2, is a vertical sectional view of the same. And Fig. 3, is a horizontal sectional view through the discharge end of the reservoir.

Similar letters of reference refer to similar parts throughout the several views.

Referring to the drawings,—The numeral 1 designates a suitable pan or tray which need be only deep enough to hold a relatively small quantity of water. In the center of this tray is supported an automatic feed water container or reservoir 2, which as illustrated is arranged and constructed in the following manner: This reservoir comprises a hollow sphere or bulb having a depending neck 3, which is open at its lower end, and the reservoir may be made of any suitable material but preferably of glass, so that the quantity of water therein may be ascertained at a glance. The neck 3 may be cylindrical throughout its length, and supported a slight distance above the tray to permit the water to flow therefrom, but in order to conveniently support the reservoir in the tray and so as to permit water to flow therefrom, the lower end of the neck 3 is formed with oppositely disposed vertical extensions 4, which are V-shaped in cross section to form channels or conduits which extend from the lower end of the neck to points a suitable distance above the said lower end or throughout the length of the neck if desired. The lower ends of these conduits are upwardly curved toward their outer edges or apexes, so as to lie slightly above the bottom of the tray, for a purpose to be presently explained.

In the center of the tray is secured a plug 5, which may be of cork or rubber, and of a size to fit tightly into the neck of the reservoir. This plug may be secured to the tray in any suitable manner, but I preferably employ a sharp pointed tack or small nail 6, the head of which is soldered to the tray with the shank thereof in a vertical position. The plug is pressed down upon the nail and is thus held securely in place. When the plug is inserted in the neck of the reservoir, the channels 4 permit the water to flow therefrom, and by reference to Fig. 2, it will be seen that the plug does not extend quite to the upper ends of the channels 4, thus leaving communication between the channels and the neck above the top of the plug, it being apparent that if the plug extended beyond the upper ends of the channels the flow of water from the reservoir would be prevented. The turn at the lower ends of the channels 4, prevents the apex portions of the channels from contacting with the bottom of the tray, and the space thus left between the ends of the channels and the bottom of the tray permits the water from the reservoir to flow out into the tray until it reaches a depth sufficient to seal or close the upturned ends of the channels, when the supply from the reservoir is cut off and remains so until by evaporation the water in the tray is so diminished as to unseal the ends of the channels and thus permit a quantity of water from the reservoir to flow into the tray sufficient to again seal the ends of the channels.

In connection with the fluid supply, I employ sheets or disks 7, of poison-retaining paper, which are preferably cut into circular form and pressed upon the nail 6, after which the plug 5 is pressed upon the nail and against the paper, thus holding the same against accidental displacement. The poison in the paper impregnates the water, which causes the destruction of the flies.

When the paper is secured as above described, the neck of the bottle rests upon the paper instead of upon the bottom of the tray, as clearly shown by the drawings.

The neck of the reservoir may rest directly upon the paper, if desired, and the channels in the neck be omitted, in which case the water would be drawn from the reservoir by capillary attraction, and the flow would cease when the paper becomes thoroughly saturated. Also the channels may be omitted in the reservoir, and placed in the plug, if desired.

The arrangement above described comprises a simple and effective style of reservoir, as well as the means by which the said reservoir is secured to and supported within the tray, but my invention contemplates any style of reservoir which will automatically discharge water into the tray by the unsealing of its outlet by water already in the tray, which has fallen below a predetermined level, through evaporation or other causes.

Having described my invention, what I claim as new and desire to secure by Letters Patent, is:

The combination with a tray having a fixed vertical pin, disks of poison-retaining material on said pin, and a resilient plug on said pin in contact with said poison retaining material, of a reservoir having a depending neck which fits over said plug and against said poison-retaining material, said neck having interior outlet channels, the lower ends of which are closed when water from said reservoir rises in the tray to a predetermined depth thereby cutting off the flow from the reservoir.

In testimony whereof I affix my signature in presence of two witnesses.

SAMUEL GOLDHAMMER.

Witnesses:
JOHN SCHUTZ,
G. SARGENT ELLIOTT.

Copies of this patent may be obtained for five cents each, by addressing the "Commissioner of Patents, Washington, D. C."